United States Patent [19]

Shirato et al.

[11] 4,334,234

[45] Jun. 8, 1982

[54] LIQUID DROPLET FORMING APPARATUS

[75] Inventors: Yoshiaki Shirato, Yokohama; Yasushi Takatori, Sagamihara; Toshitami Hara, Tokyo; Yukuo Nishimura, Sagamihara; Michiko Takahashi, Tokyo, all of Japan

[73] Assignee: Canon Kabushiki Kaisha, Tokyo, Japan

[21] Appl. No.: 134,769

[22] Filed: Mar. 28, 1980

[30] Foreign Application Priority Data

Apr. 12, 1979 [JP] Japan .................................. 54-39479
Apr. 12, 1979 [JP] Japan .................................. 54-39483
Apr. 12, 1979 [JP] Japan .................................. 54-39533

[51] Int. Cl.[3] .............................................. G01D 15/18
[52] U.S. Cl. .............................................. 346/140 R
[58] Field of Search ................................ 346/140 PD

[56] References Cited

U.S. PATENT DOCUMENTS 4,251,824 2/1981 Hara et al. .................. 346/140 PD

*Primary Examiner*—George H. Miller, Jr.
*Attorney, Agent, or Firm*—Fitzpatrick, Cella, Harper & Scinto

[57] ABSTRACT

A liquid droplet forming apparatus is improved by selecting particular conditions concerning total opening area of communicating ports, an area of the region having the communicating ports; various lengths in the direction along the axis of the actuating chamber; and volumes of various portions in the actuating chambers and the common liquid chamber.

21 Claims, 15 Drawing Figures

LIQUID DROPLET FORMING APPARATUS

BACKGROUND OF THE INVENTION

1. Field of the Invention

This invention relates to a multi-type liquid droplet forming apparatus which ejects a liquid in a form of droplet from a plurality of orifices closely spaced to each other, and more particularly, to a multi-type liquid droplet forming apparatus for an ink jet recording process.

2. Description of the Prior Art

Among various known recording systems, one of the very useful recording systems is a so-called ink jet recording system which is a kind of non-impact recording system substantially free from noise and can effect a high speed recording and also can record on plain paper without any particular fixing treatment. Heretofore, there have been proposed various ink jet recording processes and some are improved to use practically while some are still under development.

The ink jet recording process comprises projecting a liquid droplet, so-called ink, toward and attaching it to a record receiving member such as paper. Liquid droplet forming systems for ink jet recording process may be classified on the basis of the method of forming the droplet and the means for controlling the direction of projection of the droplet.

One representative system is that as disclosed, for example, in U.S. Pat. Nos. 3,596,275 and 3,298,030, that is, a liquid droplet stream of a controlled electric charge amount is produced by a continuous vibrating method and projected between deflection electrodes where a uniform electric field is present, and thus the trajectory of droplets is controlled so as to attach the droplets to a record receiving member. This system is generally called a "continuous system".

Another representative system is, for example, that disclosed in U.S. Pat. No. 3,747,120. A recording head having an orifice ejecting liquid droplets for recording is provided with a piezoelectric vibrator to which electric signals are applied on demand to convert the electric signals to mechanical vibration resulting in ejection of liquid droplets from the orifice to project them toward and attach them to a record receiving member. This is the so-called "on-demand system".

When the above mentioned ink jet recording processes are conducted by scanning by a single orifice head, a high speed recording is difficult because the scanning takes a lot of time. Therefore, the so-called multi-type system is recognized as an advantageous one for high speed recording. According to the multi-type system, the ink droplet ejecting orifices are arranged in the form of multi-array and a recording corresponding to a predetermined width or area is effected at once.

There are known various problems with using the ink jet recording technique as a multi-array system. Among them, the most serious problem is that quality of the recorded letters or signs can be hardly kept at a high grade.

In other words, a multi-type ink droplet forming apparatus where a number of actuating chambers having ink droplet ejecting orifices are assembled at a high density, cross talk is liable to often occur and an ink droplet may be ejected from an actuating chamber to which a signal is not applied because said actuating chamber is affected by an input signal to the adjacent actuating chamber or there occurs an interference between adjacent chambers as to the ink ejecting actin. As the result, the recorded letters or signs often suffer from smudge, defect portion, or irregularity.

SUMMARY OF THE INVENTION

An object of the present invention is to provide a liquid droplet forming apparatus free from the above mentioned drawbacks.

Another object of the present invention is to provide a liquid droplet forming apparatus capable of maintaining good quality of recorded images when used for an apparatus of a type where liquid droplet formation is effected by means of a number of ejecting orifices arranged at a high density.

A further object of the present invention is to provide a liquid droplet forming apparatus having high efficiency of liquid droplet ejection, high ejection response, high ejection stability and excellent long time and continuous ejection stability.

Still another object of the present invention is to provide a liquid droplet forming apparatus which is useful for easily producing a very practical and high density multi-orifice type of liquid droplet jet recording apparatus.

According to one aspect of the present invention there is provided a liquid droplet forming apparatus which comprises a predetermined number of actuating chambers each of which has an opening for ejecting a liquid droplet, and an intermediate liquid chamber for supplying the liquid to the actuating chamber, the intermediate liquid chamber being communicated with the actuating chambers, communicating ports between the intermediate liquid chamber and the actuating chambers being present at a region of the inside wall surface of the intermediate liquid chamber, and a ratio of W/S being 50–300 where W is the area of the region of the inside wall surface of the intermediate liquid chamber where the communicating ports exist and S is the total opening area of the communicating ports.

According to another aspect of the present invention there is provided a liquid droplet forming apparatus which comprises: a predetermined number of actuating chambers, each comprising an opening for ejecting a liquid droplet, an energy actuating portion for imparting to the liquid a force for ejecting the liquid droplet, and an inlet port for the liquid, and a common liquid chamber for supplying the liquid through the inlet port communicated with the actuating chamber, where the distance between the opening ejecting a liquid droplet and the end of the actuating portion at the opening side ($L_1$) and the distance between said end and the inside wall surface opposite to the inlet ports of the common liquid chamber ($L_2$) satisfy the condition $$0 < L_1/L_2 \leqq 1.$$

According to a further aspect of the present invention there is provided a liquid droplet forming apparatus which comprises: a predetermined number of actuating chambers, each comprising an opening for ejecting a liquid droplet, an energy actuating portion for imparting to the liquid a force for ejecting the liquid droplet, and an inlet port for the liquid, and a common liquid chamber for supplying the liquid through the inlet port communicated with the actuating chamber, where the volume between the opening ejecting a liquid droplet and the end of the energy actuating portion at the opening side in the actuating chamber ($V_1$), the volume of the energy actuating portion in the actuating chamber ($V_H$), the volume between the inlet port and the end of the energy actuating portion at the inlet port side ($V_2$), the volume of the common liquid chamber ($V_3$) and the number of the actuating chambers (M) satisfy the conditions, $V_1/V_H>0.32$, $V_2/V_1>0.03$, and $V_3/(V_H \cdot M)>16$.

DESCRIPTION OF THE PREFERRED EMBODIMENTS

According to the present invention, even when the construction of the apparatus is such that many actuating chambers for ejecting a liquid droplet in response to an input signal are collectively connected to a common liquid supplying portion at a high density, for example, 8 lines/mm or more, cross talk does not occur at all. In other words, according to the structure of the liquid droplet forming apparatus of the present invention, a pressure wave formed in each actuating chamber by an input signal indicating the formation of a liquid droplet is not transferred to the adjacent actuating chambers through the common liquid supplying portion.

For the purpose of avoiding cross talk, it is required to construct the apparatus in such a manner that W/S is at least 50. However, there is another limitation depending upon the size of the apparatus and there is an upper limit of W/S. That is, the larger the value of W/S, the larger the common liquid supplying portion. Therefore, for the purpose of making the whole volume of the apparatus smaller, the value of W/S has an upper limit.

Taking the above matters into consideration, the value of W/S is preferably in the range of 50–300 in the apparatus of the present invention.

The present invention will be further explained by the following example.

EXAMPLE

An ink jet head of a multi-type is constructed as shown below.

FIG. 1 shows diagrammatically oblique views of two construction parts A and B of an actuating portion block of an ink jet head of a multi-orifice array type.

Figure 1A:
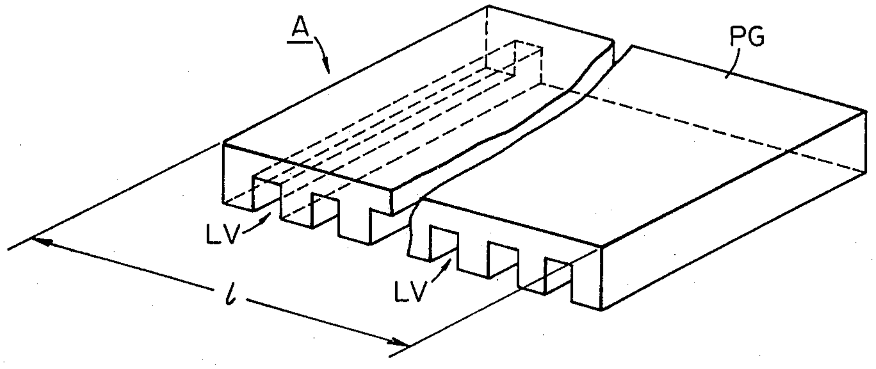
FIG. 1A, FIG. 1B and FIGS. 2–4 are diagrams for explaining an embodiment of the present invention.
Figure 1B:
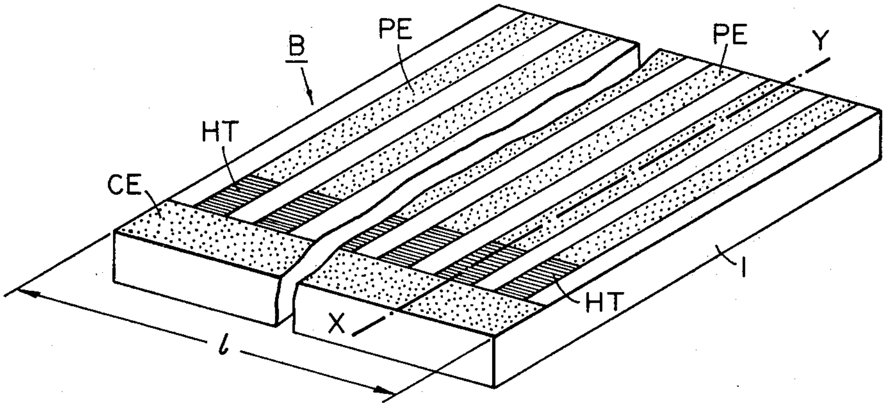

FIG. 1A and FIG. 1B show the parts A and B, respectively.

Construction part A is produced as shown below. Both sides of a plane plate of a photosensitive glass of an alkali metal fluoride series (a glass composition comprising $SiO_2$, $Li_2O$, $Na_2O$, $K_2O$, $Al_2O_3$, Au, AgCl, and $CeO_2$) are ground and then cut to obtain a plate of 100 mm×100 mm (2 mm thick). Commercially available photosensitive glasses of this type are, for example, Fotoceram, Fotoform (tradenames, supplied by Corning Glass Works). Any of them may be used.

The photosensitive glass plate PG is then exposed to interference fringes of 80 microns in pitch and 40 microns in width by removing the light of wavelength of 310 mm from a dye laser. The interference fringes are uniform in a plane of 90 mm×90 mm. The power of the laser is 10 W, and the photosensitive glass has an absorption of $Ce^{++}$ at wavelength of 310 microns and therefore, selective exposure can be conducted by laser of a wavelength corresponding to this absorption.

After exposure to the interference fringes, the resulting glass plate PG is heated at about 600° C. for one hour to crystallize.

Then, the surface of the glass plate opposite to the exposed surface is coated with a resin and then soaked in about 5% aqueous HF to effect etching while applying supersonic waves. In this etching, the etching speed at the crystallized portion in the glass plate PG is far faster than that at the non-crystallized portion, and actually the ratio of etching speed is about 20:1.

By the above treatment there are formed a predetermined number of long grooves LV of a cross section of 40 microns×40 microns and a pitch of 80 microns.

The grooves LV are not limited to the above mentioned ones, but may be changed in the range of a cross section of from 10 microns×10 microns to 150 microns×150 microns and a pitch of from 30 microns to 200 microns.

The grooved surface of the resulting glass plate PG having long grooves LV is coated with an epoxy resin as an adhesive by a dipping method. In this case, when the glass plate is pulled up in the direction parallel to the axis line of the groove LV, there can be obtained a substantially uniform epoxy resin film along the wall surface of the formed groove LV. Then, the epoxy resin film is preliminarily dried at 100° C. for about 5 minutes to half-cure and the glass plate PG is cut to a size of 10 mm×10 mm (2 mm thick). This is called part "A".

The adhesive is not limited to the above mentioned epoxy resin. The adhesive is a material which can act as an adhesive by heating, for example, adhesives of organic compound series such as epoxy resin adhesives, phenolic resin adhesives, urethane resin adhesives, silicone resin adhesives, triazine resin, BT resin and the like, and adhesives of inorganic compound series such as molten silver salts disclosed in U.S. Pat. No. 3,089,799, low melting point glasses and the like. Among them, most of the adhesives of inorganic compound series are not liquid, but powders.

Figure 2:
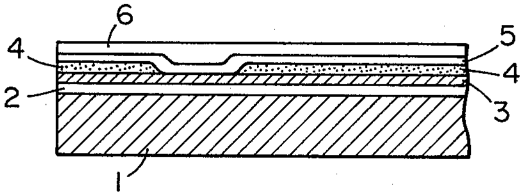

Apart from the above, a construction part B as shown in FIG. 1B is also prepared. As shown in FIG. 2 which is a cross sectional view of FIG. 1B taken along a line X-Y, the part B is constructed such that on one side of a substrate 1 (0.6 mm thick) composed of a material such as alumina, monocrystal silicon and metals (aluminum, iron etc.) are subsequently laminated a heat accumulating layer 2 ($SiO_2$ sputtered film of 2–3 microns thick), resistive heater layer 3 ($HfB_2$ sputtered film of 500–1000 Å thick), electrode layer 4 (aluminum vapor-deposited layer of 700–800 Å), protecting layer 5 ($SiO_2$ sputtered film of 1 micron) and clearcoling layer 6 (Parylen, Silicone, $Ta_2O_3$ sputtered film and the like) and then the resulting laminate is cut to a predetermined size.

In this case, an electrode layer 4 is etched to obtain a predetermined pattern and as shown in FIG. 1B, is divided into discrete lead electrodes PE and a common lead electrode CE. Simultaneously, resistive heaters 3 are exposed in a form of a rectangular pattern HT with the same width and pitch as those of long groove LV in the construction part A.

Protecting layer 5 and clearcoling layer 6 as shown in FIG. 2 may be omitted.

Figure 3:
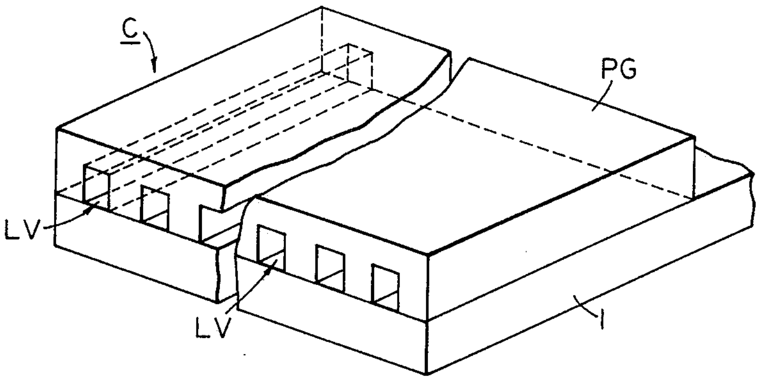
Figure 4:
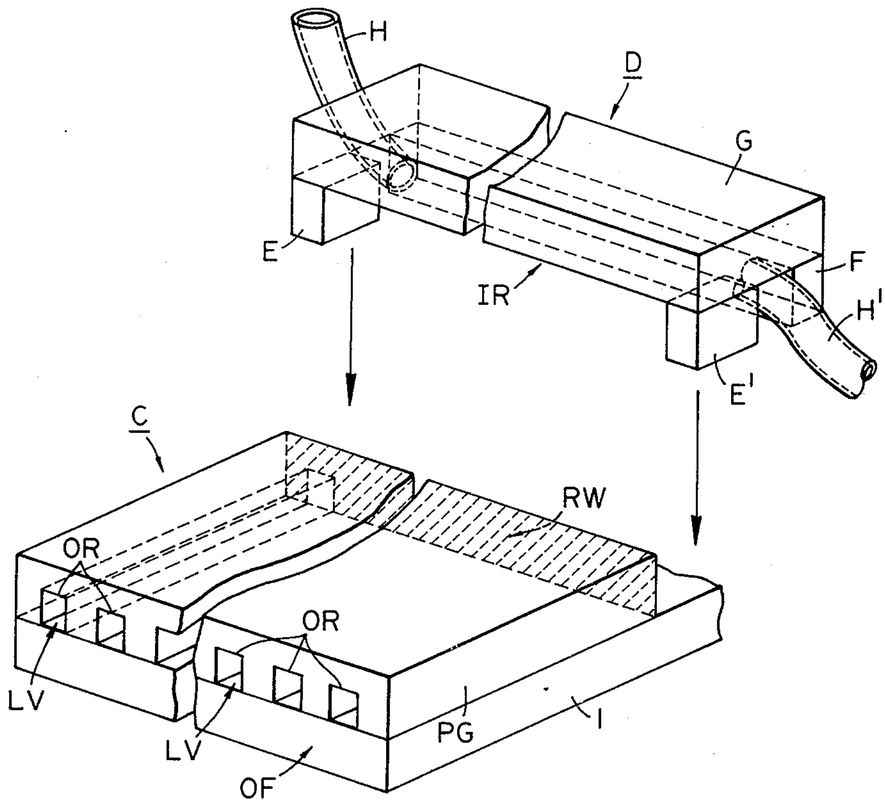

Then, the substrate 1 is cut to obtain the same width as that of the construction part A ("l" in FIG. 1A). The resulting parts A and B are positioned in such a way that grooves LV and resistive heater patterns HT are combined and then are closely contacted each other as shown in FIG. 3. Then these are heated at about 100° C. for 10 minutes to half-cure an adhesive layer (not shown) and possible deviation of positioning and clogging of groove LV are checked. If there is such defect, parts A and B are separated from each other and part B is washed to use again while part A is discarded. When there is not any defect, they are heated at 100° C. for 50 minutes and then at 180° C. for 2 hours to cure completely the adhesive layer. After that, clogging of groove LV is examined again and if there is no defect, the actuating portion block C thus assembled is transferred to the next step where an intermediate chamber block D for supplying ink as illustrated in FIG. 4 is assembled. Side plate parts E and E' are coated with the following adhesive and positioned to the actuating portion block C as shown in FIG. 4 by the arrows, and then, are heated at about 60° C. for one minute to half-cure the adhesive followed by examining whether there is deviation of position or the adhesive flows into the other part.

| | | |
|---|---|---|
| *Adhesive | Epikote 828 (supplied by Shell Chemical Co.) | 100 parts by weight |
| | Epomate (supplied by Ajinomoto Co.) | 40 parts by weight |

If there is any defect, parts E and E' are removed from block C and they are washed to use again. If there is no defect, they are heated at about 60° C. for 30 minutes to cure the adhesive.

Then the rear end part F is coated with an adhesive and positioned followed by heating at about 60° C. for one minute to half-cure the adhesive and an examination similar to that in the previous step is effected. If any defect is found, the part is washed while if no defect is found, the adhesive is cured by heating at about 60° C. for 30 minutes.

Then, an upper part G is coated with an adhesive and positioned followed by heating at about 60° C. for one minute to half-cure. The resulting assembly is examined in the manner shown above. If there is any defect, washing is effected in a way similar to that as mentioned above while if there is no defect, the assembly is heated at about 60° C. for 30 minutes and then at about 100° C. for 10 minutes to cure completely the adhesive.

Tube parts H and H' are inserted into the predetermined portions of the resulting block and an adhesive is packed into the gaps. Here the curing of adhesive should be slowly carried out so that the assembly is allowed to stand at room temperature for 30 minutes. Then it is examined to determine if the adhesive flows into tube parts H and H' or the intermediate chamber for ink supply. If there is any defect, washing is effected in a way similar to that as mentioned above for using again while there is no defect, the assembly is heated at about 60° C. for 30 minutes and then at 100° C. for 10 minutes to cure completely.

In this way, the connection of the intermediate chamber block D to the rear end of the actuating portion block C is accomplished. In the above step, in the rear end of the actuating portion block C the entire region of the wall RW indicated by a dotted line hatching in FIG. 4 constructs one wall of the intermediate chamber IR. Thus the intermediate chamber block D is connected to the rear end of the actuating portion block C. The end OF where the ejecting orifices OR are disposed is ground with an abrasive (more than #1000) to form a flat and smooth surface. The abrasive and other matters having entered the grooves LV from the orifices OR during grinding are removed by washing.

The resulting orifice disposing end surface OF is examined as to whether it is completely flat and the grooves LV are completely washed. If the grinding is not sufficient, grinding is repeated again followed by washing, and then examination is conducted again. If the grinding is still incomplete, the above step is repeated while if the grinding is complete, the assembly of block C and block D is dried and the resulting completed head is adhered to an aluminum plate and then lead electrodes are connected to a flexible wire circuit plate.

The recording head thus produced is used for ink jet recording, an embodiment of which is explained below referring to FIG. 4. Though FIG. 4 shows separated blocks, these blocks are integrally bonded each other for actual recording operation. Ink is fed into the intermediate chamber IR through parts H and H' and then introduced into each long groove LV. Electric pulse signals are applied to resistive heaters (not shown) to produce thermal pulses and the ink is instantly subjected to a state change.

This state change causes a pressure wave (actuating force) in the ink and droplets of ink are ejected from orifices OR in communication with the actuating chamber LV and impinged on a record receiving member (not shown) to effect recording.

Actually, when an electrical pulses are applied to every other resistive heater in long groove LV under the conditions below, an ink droplet is ejected from each orifice OR of the energized resistive heaters and the size and ejection speed are stable, and therefore the recorded dots are substantially uniform. An ink droplet is not ejected from a long groove LV to which an electric pulse is not applied.

| | |
|---|---|
| Condition of signal pulse: | |
| Input pulse width | 10 $\mu$ sec. |
| Pulse frequency | 10 KHz |
| Input energy | 0.01 mJ/pulse (per one resistive heater) |
| Ink composition: | |
| Water | 70 parts by weight |
| Diethylene glycol | 20 parts by weight |
| Black dye (Nigrosine) | 1 part by weight |

A modified example is shown below.

Four plates of the same photosensitive glass PG as in the above example are prepared, and following the procedures of the above mentioned example, the following four types of long grooves are formed, respectively.

(1) Long grooves of 20 microns×20 microns in cross section and 40 microns in pitch.

(2) Long grooves of 30 microns×30 microns in cross section and 60 microns in pitch.

(3) Long grooves of 50 microns×50 microns in cross section and 100 microns in pitch.

(4) Long grooves of 60 microns×60 microns in cross section and 120 microns in pitch.

All of them are cut to form a member of the same size as in the above mentioned example. The resulting plates are combined with construction parts B provided with resistive heater patterns (HT) corresponding to the grooves, respectively, and they are bonded to each other to form 4 pieces of actuating portion block C. These blocks C are connected to intermediate chamber blocks D, respectively, to assemble recording heads.

The resulting recording heads are operated to eject ink droplets under the same conditions as in the above mentioned example. All of them exhibit good results.

As described above, according to the present invention, there can be provided a liquid droplet forming apparatus of a multi-type which exhibits very good response to input information signals for ejecting ink droplets and a very good ink ejecting state, and produces recorded images of high quality at a high speed without causing any cross talk at all.

Another aspect of the present invention is described below.

Figure 5:
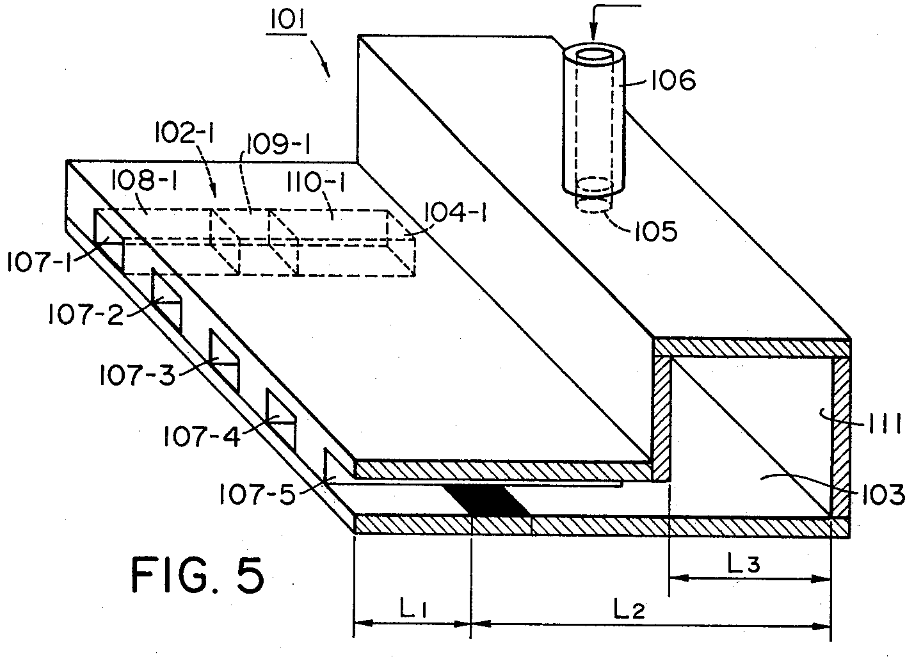
FIG. 5 is a oblique view of another embodiment of the present invention partly in cross-section.

Referring to FIG. 5, an embodiment of this aspect is illustrated, and a part of the ink jet recording head 101 is cut along one liquid flow conduit to show the inside structure.

In the recording head 101 there are arranged many liquid ejecting portions 102 at a predetermined interval. The liquid ejecting portions are connected to a common liquid chamber 103 at the rear portion through liquid inlet ports 104; that is, the liquid in the common liquid chamber 103 is supplied to each liquid etching portion 102 through each port 104.

Common liquid chamber 103 is provided with a feeding port 105 which is connected to a liquid supplying pipe 106. The liquid is supplied to common liquid chamber 103 in the direction as indicated by the arrow from a liquid supplying source (not shown).

Each liquid ejecting portion 102 comprises an orifice side region 108 having an ejecting orifice 107 at the tip, an energy actuating portion 109 where an energy acts on the liquid to eject the liquid, and an inlet port side region 110 having an inlet port 104 for introducing the liquid to the energy actuating portion, and further these regions and portion are communicated with each other at least upon effecting recording.

In FIG. 5, the distance between orifice 107 and the end near the orifice of the energy actuating portion 109 is designated as $L_1$ and the distance between the end near the orifice of the energy actuating portion 109 and the inside wall surface 111 opposite to the inlet port 104 of the common liquid chamber 103 is designated as $L_2$. The present inventors have found that $L_1$ and $L_2$ are important factors in determining liquid ejecting efficiency, liquid supplying efficiency of supplying the liquid to each liquid ejecting portion 102 from the common liquid chamber 103, and liquid droplet forming frequency (the number of liquid droplet ejected per unit time). In particular, the relation between $L_1$ and $L_2$ determines the recording performance of the recording head and it has been found that good recording can be effected when the relation satisfies the condition, $$0<L_1/L_2\leqq 1.$$

In the above, a structure where $L_1$ is zero should be avoided; that is, in such a structure the energy actuating portion reaches the orifice and this causes a defective liquid droplet ejection. In other words, the liquid droplet ejected from an orifice of such recording head ($L_1=0$) can not be a droplet of a constant particle size, but is divided into many fine droplets, that is; the so-called "splash" occurs often. As a result, a structure of $L_1=0$ should be avoided.

In particular, it has been found that the relation between $L_1$ and $L_2$ is a key factor in determining the recording characteristics in case of the recording head of Japanese Patent Application No. Sho 52-118798 where liquid etching portions 102 are arranged at a high density.

There is provided an energy generating means, and if necessary, this means may be arranged inside of the energy actuating portion 109. For example, when the recording head of the present invention is applied to the recording processes as disclosed in U.S. Pat. Nos. 3,683,212, 3,946,398 and the like, an electromechanical transducer such as a piezoelectric element and the like is arranged at the energy actuating portion 109 as an energy generating means. Input recording signals to the electromechanical transducer generate pressure energy (a pressure wave), which acts on the liquid in the energy actuating portion 109 to eject droplets from orifice 107 and project them.

According to the recording process disclosed in Japanese Patent Application No. Sho 52-118798, an electrothermal transducer is provided at an energy actuating portion 109 and input recording signals applied to the transducer generate heat energy, which causes an abrupt state change of the liquid in the energy actuating portion 109, for example, liquid droplets are ejected from the ejecting orifice by the force generated by the abrupt state change of the liquid involving the formation of a bubble due to vaporization of the liquid.

Further, in the case of the recording process of Japanese Patent Application No. Sho 52-118798, it is not necessary to provide the energy actuating portion 109 with an energy generating means, but such means may be arranged at the outside of the recording head to conduct recording. Even in this case, it is necessary that the position of the energy actuating portion 109 is determined so that the above mentioned relation is satisfied. Satisfying the relation results in a remarkable improvement in liquid droplet ejecting characteristics, in particular, it favors a high speed recording and a high density multi-orifice system.

In FIG. 5, the recording head 101 has liquid ejecting portions 102, each of which has a rectangular cross section, whose size is the same at any point from the tip of the orifice side end portion 108 to the inlet port 104 in the inlet port side end portion 110. According to the present invention, the structure of the liquid ejecting portions is not limited to such structure, but may be such that the cross section is circular, semi-circular or of any other shape and the size of the cross section varies or does not vary from the orifice 107 to the inlet port 104.

Where $0<L_1/L_2 \leqq 1$, very good recording characteristics can be obtained even when, for example, the cross sectional area of the liquid ejecting portion (cross sectional area perpendicular to the direction of the liquid flow) is $1\times10^3$–$5\times10^4$ $\mu m^2$ in average and the liquid ejecting portions are disposed at a density as high as 8 lines/mm or more.

For further enhancing the advantages of the present invention, it is necessary, in addition to the above mentioned condition, that the distance between the inlet port 104 and the inside wall 111 of the common liquid chamber 103 which opposite to the inlet port be a certain length or more. That is, when the distance between the inlet port 104 and the inside wall 111 of the common liquid chamber 103 is designated as $L_3$, $L_3$ is required to be usually 0.5 mm or more, preferably 1 mm or more for the purpose of supplying stably, uniformly and smoothly the liquid to each liquid ejecting portion.

Figure 6:
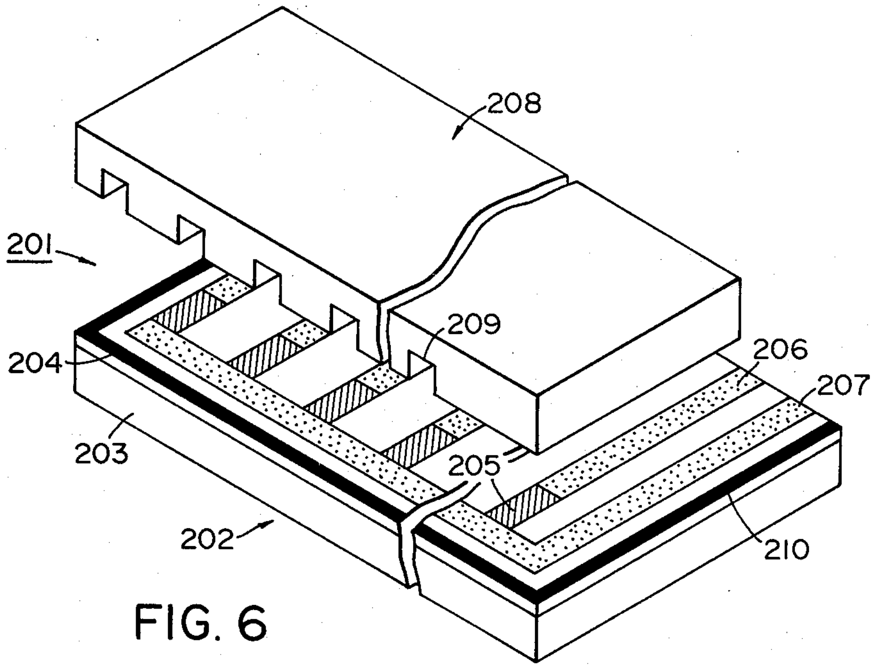
FIG. 6 is a diagram showing a further embodiment of the present invention.

The advantageous effect of the above mentioned construction of a recording head of the present invention is explained referring to the recording process of Japanese Patent Application No. Sho 52-118798. FIG. 6 discloses a diagrammatical construction of liquid ejecting portions of recording head 201.

A lid member 202 includes a substrate 203, a heat accumulating layer 204 overlying the substrate 203, heat generating members 205, selective electrodes 206 for applying current to generate heat selectively at the heat generating members 205 along the flow conduit of each liquid ejecting portion and a common electrode 207 electrically connected to the end portion of each heat generating member which overlies the heat accumulating layer 204.

A grooved plate 208 is provided with a predetermined number of grooves 209 with a predetermined width and at a predetermined pitch. The grooved plate 208 and the lid member 202 are bonded each other in such a way that each groove 209 covers the corresponding heat generating member 205 by way of an adhesive layer 210, and thus a plurality of liquid ejecting portions are formed. Operation of the recording head 201 having such construction as above is exemplified below.

A multi-orifice ink jet recording head as shown in FIG. 5 and FIG. 6 is produced as shown below. There are 24 orifices and heat generating members. On an alumina substrate 201 of 5 mm×20 mm in size and 0.6 mm in thickness is deposited $SiO_2$ in the thickness of 4 microns by sputtering to form a heat accumulating layer 204, and then $HfB_2$ is deposited in the thickness of 1000 Å and Al is deposited in the thickness of 1000 Å by sputtering followed by selective etching to form heat generating members 205 and electrodes 206 and 207. In this case, each heat generating member 205 is patterned in a size of 40 microns×250 microns and 100 microns in pitch (24 pieces of a heat generating member disposed in parallel). The resistance of each heat generating member 205 is 100 ohm. An $SiO_2$ film of 1 micron thick is formed as a protecting film for protecting the heat generating member 205 from the liquid. Then a grooved glass plate 208 having grooves each of which has a cross section of 40 microns×40 microns is bonded to the lid member as prepared above in such a manner that a groove is combined with a heat generating member 205 by using the adhesive layer 210. The resulting orifice end surface is ground. The glass plate is cut to produce a member of an appropriate size and adhered by an adhesive to form a common liquid chamber. The resulting recording head is of $L_1=500$ microns, $L_2=1.5$ mm and $L_3=1$ mm.

Then the common liquid chamber is filled with an ink composed of a solvent mainly consisting of ethyl alcohol and 3% by weight of a black dye dispersed therein and a rectangular voltage of 10 μsec is applied to each heat generating member at a cycle of 200 μsec corresponding to a signal and there is obtained a good record at 20 volts.

However, when $L_3$ of the common liquid chamber is 200 microns, the liquid can not be sufficiently supplied and as a result, in case of a pattern where 24 dots are continuously recorded, the density of the printed record is low.

When the pulse signal as mentioned above is applied at $L_1=2$ mm, $L_2=0.2$ mm and $L_3=1$ mm, ejection of liquid droplets begins at 27 volts to effect recording, but the sizes of the recorded dots are not uniform and further there are formed recorded points which do not correspond to the signal.

As shown in the above example, according to the present invention, there is designed a recording head satisfying the condition $O<L_1/L_2 \leqq 1$, and usually $L_1$ is 30–$1\times10^3$ microns and $L_2$ is 100–$5\times10^4$ microns, preferably $L_1$ is 50–500 microns and $L_2$ is $2\times10^3$–$1\times10^4$ microns.

Figure 7A:
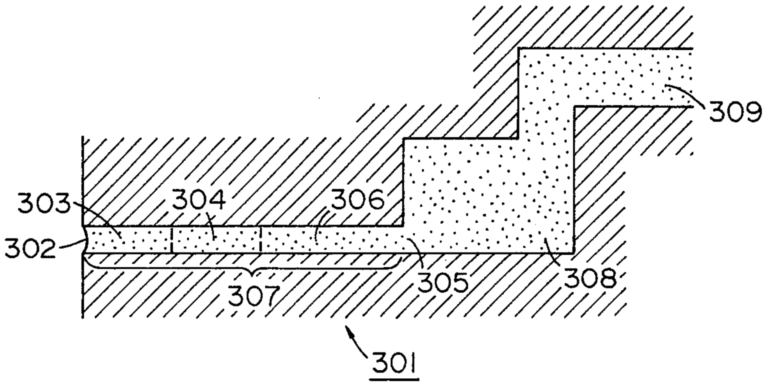
FIG. 7A and FIG. 7B are diagrams for explaining a feature of a still further embodiment of the present invention, and show diagrammatically a cross sectional view and a plane view, respectively.
Figure 7B:
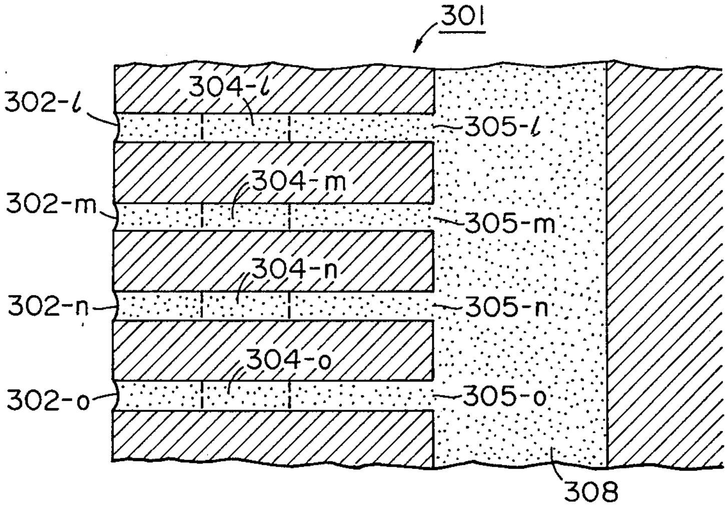

A further aspect of the present invention is explained below. FIG. 7A is a diagrammatical cross sectional view and FIG. 7B is a diagrammatical plane view of an embodiment of a recording head according to said aspect, and there are shown only structures indicating the flow conduit of the liquid for convenience.

The recording head 301 includes a thin liquid flow conduit and is provided with a liquid ejecting portion 307 comprising an orifice side end region 303 having an orifice 302 for ejecting the liquid at the tip, an energy actuating portion 304 where an energy for ejecting the liquid actuates and an inlet port side region 306 having an inlet port 305 for introducing the liquid into said actuating portion.

The inlet port side region 306 is communicated with a common liquid chamber 308 through the inlet port 305 and the common liquid chamber 308 is provided with a supplying conduit 309 for supplying for liquid to said common liquid chamber 308.

Common liquid chamber 308 is communicated with a plurality of energy actuating portions (. . . 304-l, 304-m, 304-n, 304-o, . . . ) through a plurality of inlet ports (. . . 305-l, 305-m, 305-n, 305-o, . . . ), and a liquid droplet is ejected through an orifice 302 corresponding to each energy actuating portion in response to a recording signal applied to the energy actuating portion and the liquid corresponding to the decrement due to ejection is rapidly supplied from the common liquid chamber to each energy actuating portion.

According to an aspect of the present invention, stability of liquid droplet ejection and quality of images recorded by liquid droplets are improved by designing the recording head such that the following conditions are satisfied:

$$V_1/V_H>0.32$$

$$V_2/V_1>0.03$$

and $$V_3/(V_H\cdot M)16$$

where $V_1$ is a volume of an orifice side region, $V_H$ is a volume of an energy actuating portion, $V_2$ is a volume of an inlet port side region, $V_3$ is a volume of a common liquid chamber and M is a number of the energy actuating portion.

An example of the recording head of the present invention is explained below referring to that adapted to the ink jet recording process disclosed in Japanese Patent Application No. Sho 52-118798, but the present invention is not limited to this embodiment and may be used for a multi-orifice type of recording head of various other ink jet recording processes.

The example will be explained more in detail below referring to FIG. 8 and the above mentioned Japanese Patent Application.

Figure 8:
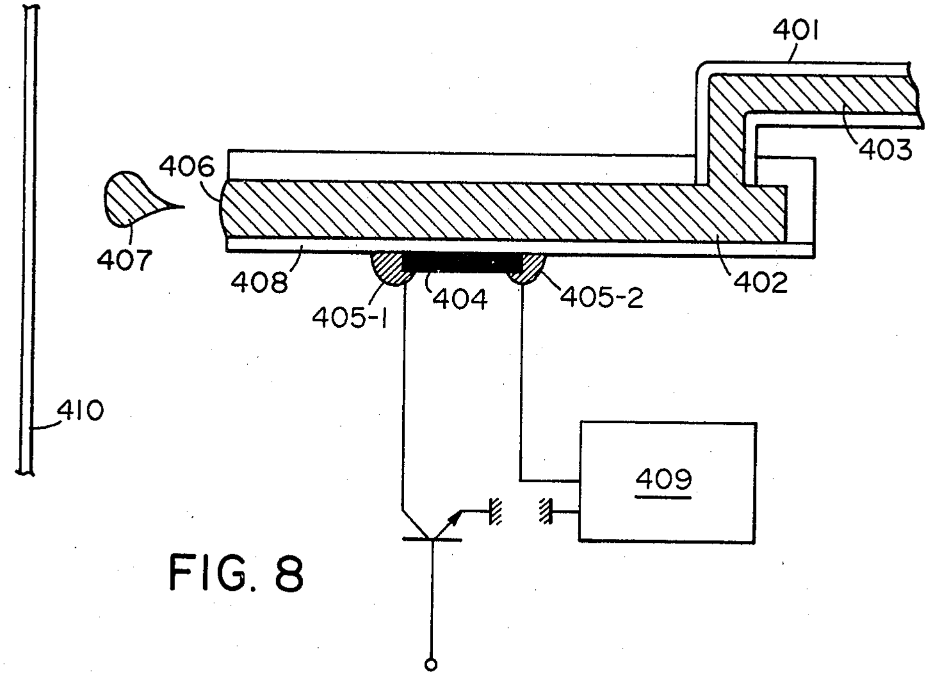
FIG. 8 is a diagrammatic sectional view of a recording head for explaining a process for recording to which the recording head of the present invention can be applied.

In FIG. 8, the recording liquid 403 generally called "ink" introduced into a liquid chamber 402 from a liquid supplying pipe 401 is subjected to a state change instantly in response to the generated heat due to application of current to an electrothermal transducer 404 attached to the above mentioned liquid chamber 402.

The transducer 404 generates heat in the form of a pulse corresponding to an on-off of current through electrodes 405-1 and 405-2 connected thereto. In this way, the state change of the recording liquid 403 applies a force to the liquid 403 at the orifice side. As the result, the liquid 403 is ejected from an orifice 406 as a droplet 407 and impinged on a record receiving member 401 such as paper to form a record.

The transducer 404 is mounted on a substrate 408 and generates heat when a voltage of a power source 409 is applied to the transducer in response to input external information, and the heat vaporizes the liquid 403.

The size of the liquid droplet 407 ejected from orifice 406 varies depending upon the quantity of electric energy input to an electrothermal transducer 404 as an information, transfer efficiency of the heat energy thus produced to a recording liquid 403, conversion efficiency of an electrothermal transducer 404, size of orifice 406, inner diameter of liquid chamber 402, distance between orifice 406 and the transducer 404, actuating force to recording liquid 403, amount of liquid 403 to be actuated, specific heat, heat conductivity, boiling point and latent heat of vaporization and the like.

Therefore, the size of liquid droplet 407 can be easily controlled by changing one or more of the above-mentioned controllable factors, and it is possible to make a recording on a record receiving member 410 with an optional droplet size and spot size.

As the electrothermal transducer 404 shown in the diagram, there may be used a conventional heat sensitive print head (a so-called "thermal head") widely used in the field of heat sensitive recording. The thermal heads can be classified into thick film head, thin film head and semiconductor head depending upon the manufacturing method, type of the resistive heater and the like, and all of them are employable. However, when a high speed recording with a high resolution is necessary, it is desirable to utilize the thin film head.

Figure 9A:
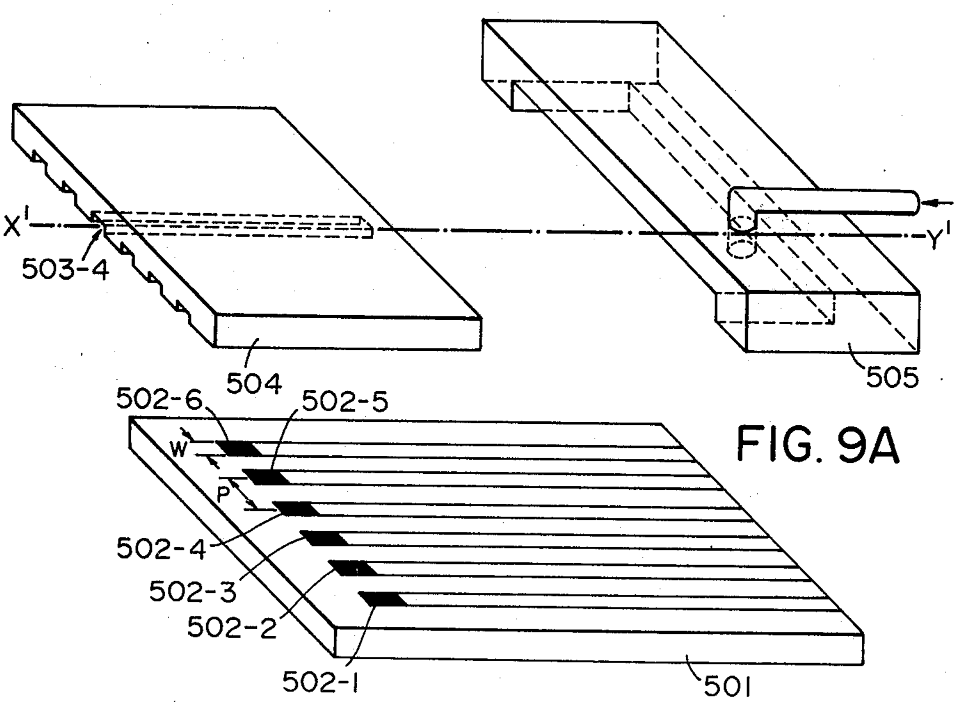
FIG. 9A and FIG. 9B are diagrams showing the structure of an embodiment of the recording head of the present invention, and are an oblique view and a cross sectional view taken along a dot and dash line X'–Y' of FIG. 9A, respectively.
Figure 9B:
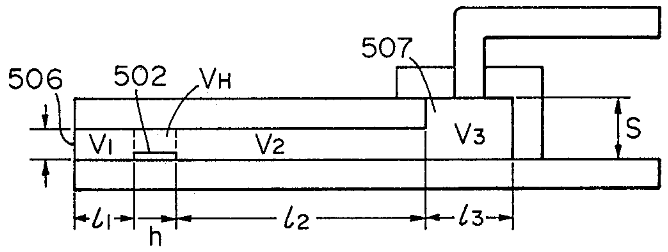

FIG. 9A is an oblique view of a multi-orifice recording head using an embodiment of the present invention before assembling and FIG. 9B is a cross sectional view taken along the dot and dash line X′-Y′ of FIG. 9A when assembled. On an $Al_2O_3$ substrate 501 composed of fine particles there are subsequently overlaid $SiO_2$ as a heat accumulating layer, $HfB_2$ as a heater layer, and Al as an electrode layer by using a thin film forming technique and then heater portions of the pattern 502 as shown in the diagrams are formed by selective etching. 150 samples of such a recording head are prepared by selecting the following dimensions, that is, referring to FIG. 9B:

- length of the heater portion, h=40, 80, and 200 microns;
- distance between orifice 506 and heater portion, $l_1$=20, 40, 80, 200, 500 and 1000 microns;
- distance between heater portion 502 and common liquid chamber 507, $l_2$=20, 40, 80, 200, and 500 microns;
- distance between the centers of adjacent heater portions, P=50, and 100 microns; and
- width of heater portion 502, W=40, and 80 microns.

Apart from the above, a thin blade edge of 40 or 80 microns thick is attached to a cutter for a semiconductor chip scriber, and grooves 503 having the above mentioned heater width and heater pitch are formed to a depth (t) of 40 or 80 microns by the cutter.

Substrate 501 and grooved plate 504 are bonded together by epoxy resin. A block 505 for constituting a common liquid chamber 507 having a depth ($l_3$) of 250, 500, 1000, 2000, or 4000 microns, and a height (S) of 100, 200, 500, 1000, 2000, or 4000 microns is then bonded by an epoxy resin. Further, lead wires for heater driving are connected to the resulting recording head. Thus 150 pieces of experimental sample heads are prepared.

Figure 10:
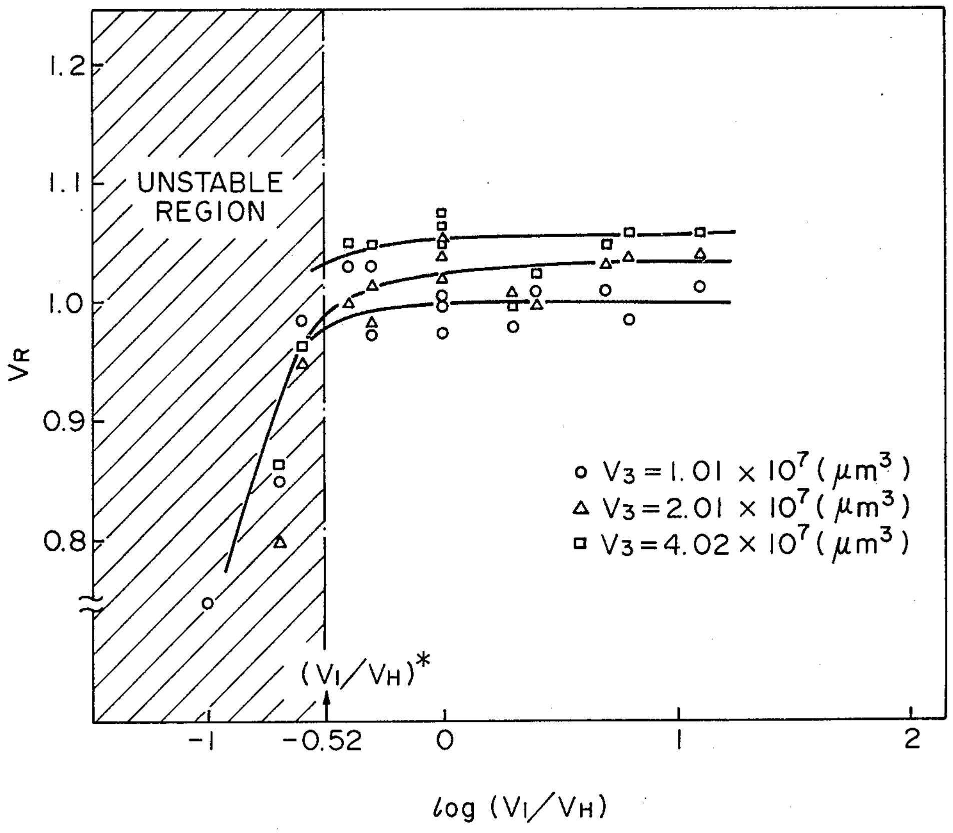
FIGS. 10–12 are graphs showing experimental results concerning the present invention.
Figure 11:
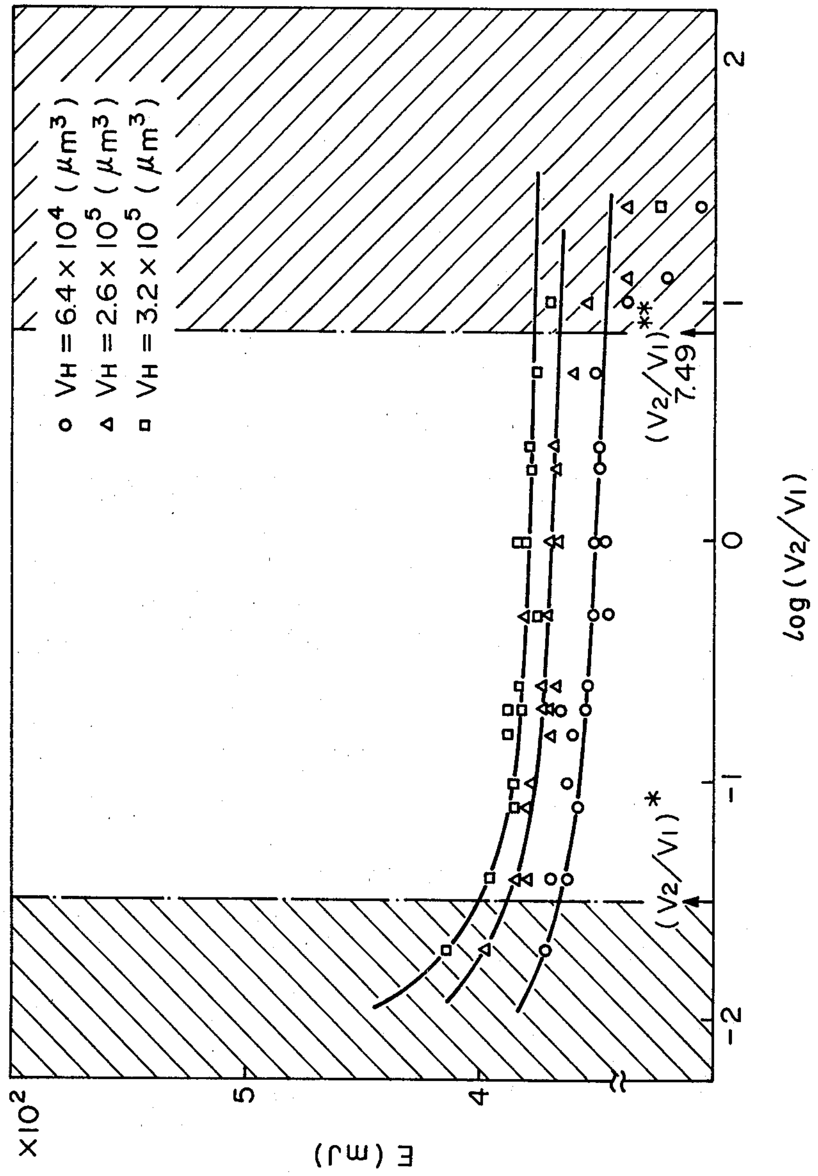
Figure 12:
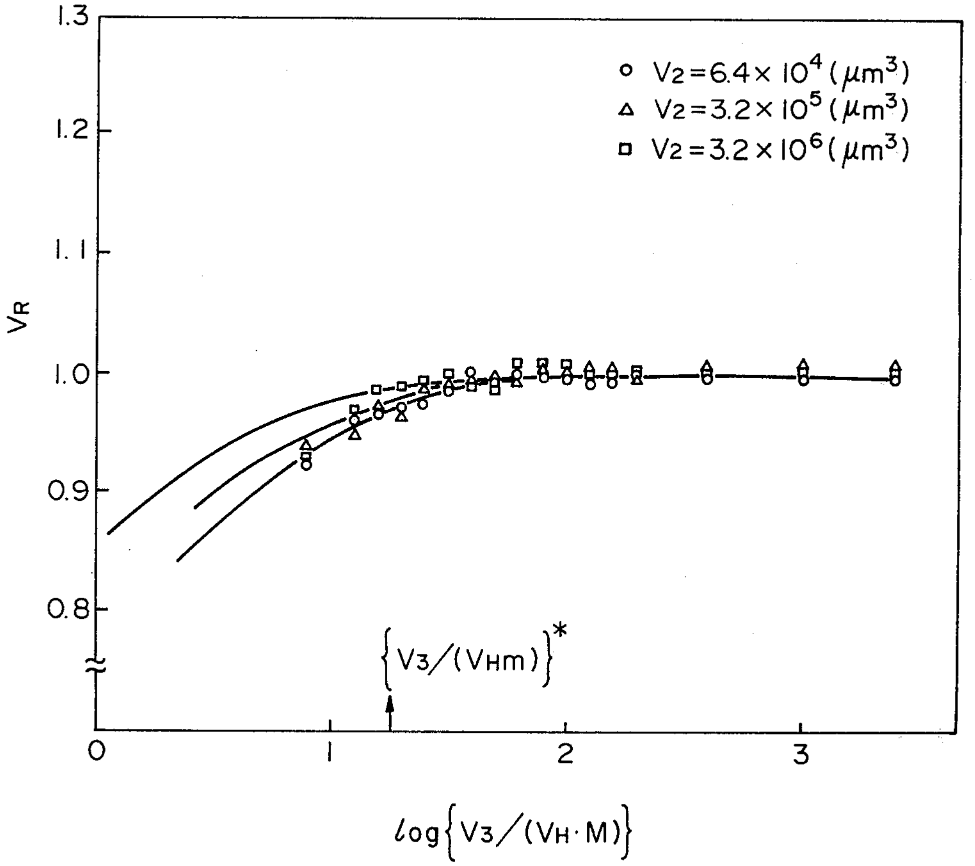

Results of liquid droplet ejecting experiments by using the above mentioned sample heads are shown in FIGS. 10-12. The data are obtained by microscopic observation under illumination of a luminous element synchronizing with the input voltage pulse for ejection.

FIG. 10 shows the relation between an ejected liquid droplet volume per a standard volume of liquid droplet optionally selected (hereinafter referred to as "specific ejected liquid droplet volume") $V_R$ and a ratio of a volume in front of the heater $V_1$ (the volume of the orifice side region) to the volume of the heater portion $V_H$ (a volume of the energy actuating portion) by means of a common liquid chamber volume $V_3$.

As is clear from FIG. 10, the ejected liquid droplet volume decreases abruptly in the region lower than log $(V_1/V_2)=-0.52$, i.e. $V_1/V_2=0.316$, corresponding to the hatched region. According to the experiment and observation, it has been found that ejection is not stable in this region. The cause of such unstable ejection is considered to be mainly attributable to unstable liquid meniscus or absence of liquid meniscus at the orifice portion after ejecting the liquid.

FIG. 11 shows the relation between an energy of input electric signal per one liquid droplet (E) and the volume ratio $V_2/V_1$ by using a heater portion volume $V_H$ as a parameter, where $V_1$ and $V_2$ are as defined above.

It is clear from FIG. 11 that the energy efficiency is lowered in the region of log $(V_2/V_1)$ of less than $-1.5$ (hatched portion).

In the region higher than log $(V_2/V_1)=0.9$ (hatched portion) there appears unstable ejection.

The former drawback, i.e. low energy efficiency, seems to be attributable to the increase in the volume to which the ejecting pressure generated at the heater portion is to be applied.

The latter drawback, i.e. unstable ejection, seems to be attributable to that the condition of $V_1/V_H<0.32$ as shown in FIG. 10 accompanies said condition of $V_2/V_1$.

In view of the foregoing, it has been found from FIG. 10 and FIG. 11 that the conditions, $V_1/V_H>0.32$ and $V_2/V_1>0.03$, improve the recording characteristics.

FIG. 12 shows the relation among a specific ejected liquid droplet volume $V_R$, a common liquid chamber volume $V_3$ and the total volume of heater portion ($V_H \cdot M$ where M is the number of heater) by using $V_2$ as a parameter where $V_2$ is as defined above, when the all heaters are simultaneously driven.

FIG. 12 and the experimental observation indicate that the size of ejected liquid droplet is decreased and unstable ejection occurs when the value of $V_3/(V_H \cdot M)$ is lower than 16. This seems to be due to the delay of liquid feeding.

In view of the foregoing, upon designing a multi-orifice recording head the following conditions:

$$V_1/V_H>0.32 \quad (I)$$

$$V_2/V_1>0.03 \quad (II)$$

$$V_3/(V_H \cdot M)>16 \quad (III)$$

Should be satisfied to give good recording characteristics and achieve the object of the present invention.

What we claim is:

1. A liquid droplet forming apparatus which comprises a predetermined number of actuating chambers each of which has an opening for ejecting a liquid droplet, and an intermediate liquid chamber for supplying the liquid to the actuating chamber, the intermediate liquid chamber being communicated with the actuating chambers, communicating ports between the intermediate liquid chamber and the actuating chambers being present at a region of the inside wall surface of the intermediate liquid chamber, and a ratio of W/S being 50-300 where W is the area of the region of the inside wall surface of the intermediate liquid chamber where the communicating ports exist and S is the total opening area of the communicating ports.

2. A liquid droplet forming apparatus according to claim 1 in which each of the actuating chambers is a long and thin conduit.

3. A liquid droplet forming apparatus according to claim 1 in which the actuating chambers are arranged substantially in parallel and at regular intervals.

4. A liquid droplet forming apparatus according to claim 1 in which the opening for ejecting the liquid and the communicating port are substantially the same size.

5. A liquid droplet forming apparatus according to claim 1 in which the intermediate liquid chamber has an ...ide wall surface which is substantially parallel to the surface plane of the communicating ports.

6. A liquid droplet forming apparatus according to claim 1 in which the opening area of the communicating port ranges from 10 microns×10 microns to 150 microns×150 microns.

7. A liquid droplet forming apparatus according to claim 1 in which each of the actuating chambers is provided with a heat generating member.

8. An liquid droplet forming apparatus which comprises: a predetermined number of actuating chambers, each comprising an opening for ejecting a liquid droplet, an energy actuating portion for imparting to the liquid a force for ejecting the liquid droplet, and an inlet port for the liquid, and a common liquid chamber for supplying the liquid through the inlet port communicated with the actuating chamber, where the distance between the opening for ejecting a liquid droplet and the end of the actuating portion at the opening side ($L_1$) and the distance between said end and the inside wall surface opposite to the inlet ports of the common liquid chamber ($L_2$) satisfy the condition $$0<L_1/L_2 \leqq 1.$$

9. A liquid droplet forming apparatus according to claim 8 in which each of the actuating chambers is a long and thin conduit.

10. A liquid droplet forming apparatus according to claim 8 in which the actuating chambers are arranged substantially in parallel and at regular intervals.

11. A liquid droplet forming apparatus according to claim 8 in which the opening for ejecting the liquid and the inlet port are substantially the same size.

12. A liquid droplet forming apparatus according to claim 8 in which said inside wall surface is substantially parallel to the surface plane of said inlet ports.

13. A liquid droplet forming apparatus according to claim 8 in which the energy actuating portion is provided with a resistive heater.

14. A liquid droplet forming apparatus according to claim 8 in which $L_1$ is in the range of from 30 microns to $1\times10^3$ microns.

15. A liquid droplet forming apparatus according to claim 8 in which $L_2$ is in the range of from 100 microns to $5\times10^4$ microns.

16. A liquid droplet forming apparatus which comprises: a predetermined number of actuating chambers, each comprising an opening for ejecting a liquid droplet, an energy actuating portion for imparting to the liquid a force for ejecting the liquid droplet, and an inlet port for the liquid, and a common liquid chamber for supplying the liquid through the inlet port communicated with the actuating chamber, where the volume between the opening for ejecting a liquid droplet and the end of the energy actuating portion at the opening side in the actuating chamber ($V_1$), the volume of the energy actuating portion in the actuating chamber ($V_H$), the volume between the inlet port and the end of the energy actuating portion at the inlet port side ($V_2$), the volume of the common liquid chamber ($V_3$) and the number of the actuating chambers (M) satisfy the conditions, $V_1/V_H>0.32$, $V_2/V_1>0.03$, and $V_3/(V_H \cdot M)>16$.

17. A liquid droplet forming apparatus according to claim 16 in which each of the actuating chambers is a long and thin conduit.

18. A liquid droplet forming apparatus according to claim 16 in which the actuating chambers are arranged substantially in parallel and at regular intervals.

19. A liquid droplet forming apparatus according to claim 16 in which the opening for ejecting the liquid and the inlet port are substantially the same size.

20. A liquid droplet forming apparatus according to claim 16 in which an inside wall surface opposite to the inlet ports of the common liquid chamber is substantially parallel to the surface plane of the inlet ports.

21. A liquid droplet forming apparatus according to claim 16 in which the energy actuating portion is provided with a resistive heater.

* * * * *

UNITED STATES PATENT AND TRADEMARK OFFICE

CERTIFICATE OF CORRECTION

PATENT NO. : 4,334,234 Page 1 of 2

DATED : June 8, 1982

INVENTOR(S) : Yoshiaki Shirato, et al.

It is certified that error appears in the above-identified patent and that said Letters Patent is hereby corrected as shown below:

Column 1, line 61, after "words" insert --in--.

Column 2, line 1, "actin" should read --action--;
line 26, insert a comma after "invention".

Column 7, line 41, "etching" should read --ejecting--.

Column 8, line 13, "droplets, that is;" should read -- droplets; that is,--;
line 20, "etching" should read --ejecting--.

Column 9, line 12, "which opposite" should read --which is opposite--.

Column 10, line 44, "supplying for liquid" should read --supplying the liquid--;
line 68, "M)16" should read --M)>16--.

Column 11, line 29, "401" should read --410--.

UNITED STATES PATENT AND TRADEMARK OFFICE

CERTIFICATE OF CORRECTION

PATENT NO. : 4,334,234

DATED : June 8, 1982

INVENTOR(S) : Yoshiaki Shirato, et al.

It is certified that error appears in the above-identified patent and that said Letters Patent is hereby corrected as shown below:

Column 12, line 40, "the volume" should read --a volume--;
line 41, "(a volume" should read --(the volume--.

Signed and Sealed this

*Twenty-second* Day of *February 1983*

[SEAL]

*Attest:*

GERALD J. MOSSINGHOFF

*Attesting Officer* *Commissioner of Patents and Trademarks*